3,296,174
LUBRICOUS COATING FOR GLASS CONTAINING POLYVINYL ALCOHOL, POLYOLEFIN EMULSION AND AN ORGANIC ACID

John Edward Pickard, Selma, Ind., assignor to Ball Brothers Company Inc., Muncie, Ind., a corporation of Indiana
No Drawing. Filed Feb. 10, 1964, Ser. No. 343,507
13 Claims. (Cl. 260—29.6)

The present invention relates to a new and improved durable, lubricous coating for glass and more particularly relates to an improved lubricous coating for glass articles such as glassware, to a novel method of forming such a coating on glass, and to a new composition employed in formation of such a coating.

Glass articles such as glassware, are handled a great number of times during manufacture, inspection, shipping, filling, use, etc. During such handling, the ware comes into contact with various mechanical devices such as feeders, conveyors, inspection devices and the like and also contacts other pieces of ware and surfaces such as boxes, shelves, etc.

This high degree of contact causes damage either by breakage, cracking, scratching or other defacing of the surface thereof. Breakage during processing creates a serious problem in that a processing line may jam which requires attention by a person, e.g., to clean the broken ware from the line. The possibility of interruption of a line due to breakage of ware necessitates a higher degree of supervision than may actually be required. Breakage during processing is also serious because of the possibility of slivers or fragments of the shattered glass being deposited in adjacent ware which is undesirable in most situations and is completely unacceptable when the ware is to be used for food packaging.

Attempts have been made in the past to minimize or eliminate the above difficulties by the application of various coatings to glass. While the coatings proposed, in some cases, have reduced breakage and damage to a degree, the coatings have created other problems. In certain cases it has been difficult to apply the coating composition to the ware and/or labels did not tightly adhere to the coated surfaces. Other coatings did not retain lubricity after washing or steam cleaning and thus were unsuccessful. Many coatings were not acceptable because they had not been approved for use in food. Thus, none of the coatings proposed provided the desired combination of improved properties.

In view of the above and other difficulties and problems with coatings for glass heretofore employed, it was completely unexpected and surprising to discover a new and improved coating for glass which overcomes many of the problems encountered in the past and, in addition, provides benefits and advantages heretofore unattainable. The coating of the present invention provides a highly lubricous surface on glass which reduces damage during handling to a minimum. Also, the coating is durable and does not lose its effectiveness when cleaned with hot water or steam. Furthermore the coating provides a surface to which labels adhere tightly even after extended periods of storage and handling. Moreover, the method of coating glass surfaces in accordance with the invention is simple and convenient and relatively low in cost. another advantage of the coating of the invention is that the appearance of the glass is not changed.

The novel lubricous coating for glass of the present invention comprises a reaction product of polyvinyl alcohol, an emulsified polyolefin and an organic acid. The coating of the present invention is advantageously formed on glass by applying a mixture of polyvinyl alcohol, an emulsified polyolefin and an organic acid to the glass and heating the coating to an elevated temperature. During heating, the components of the coating composition react to produce a durable, lubricous, substantially water-insoluble coating.

The polyvinyl alcohol advantageously is a substantially completely hydrolyzed polymer, that is, a polymer with less than about 5% by weight of residual acetate groups and a saponification number of less than about 40. Preferably, the polyvinyl alcohol has less than about 1% residual acetate groups and a saponification number of less than about 20.

The polyolefin employed in the coating of the present invention advantageously has a molecular weight of less than about 3000 and preferably in the range of about 1200 to 2700. Preferably, the polyolefin is a polyethylene having a molecular weight in the range of about 1600 to 2500.

The organic acid employed in the coating of the invention advantageously is an aliphatic acid such as a monobasic acid, e.g., carbonic acid, acetic acid, chloroacetic acid, etc., or a dibasic acid such as oxalic acid, malonic acid, succinic acid, etc.; an aromatic acid, e.g., 2,6-dihydroxy benzoic acid; and the like.

In addition to the principal components of the coating composition as set forth above, other materials may be included therein provided they do not deleteriously affect the improved properties and characteristics of the coating. For example, a pigment may be incorporated in the coating composition and dispersing or emulsifying agents may be employed to facilitate mixing of the components of the coating composition. In addition, it may be desirable to improve the "shelf life" of the composition by incorporating stabilizers, bactericides, mold inhibitors or similar materials.

The proportions of the polyvinly alcohol, the polyolefin, and the organic acid in the coating and in the coating composition of the invention are generally about equal. Advantageously, the proportion of the polyolefin is slightly less than that of the polyvinyl alcohol, for example, about 40% to 90% by weight of the polyvinyl alcohol. The proportion of the organic acid advantageously is somewhat greater than that of the polyvinyl alcohol, for example, about 10% to 300% by weight of the polyvinyl alcohol. Advantageously, a portion of the organic acid may be replaced by a small amount of an inorganic acid such as phosphoric acid, chromic acid, hydrochloric acid, and the like. Preferably, the inorganic acid is a strong mineral acid, particularly phosphoric acid.

The coating composition of the present invention may be prepared by forming an emulsion of the polyolefin, part of the polyvinyl alcohol and an emulsifying agent in water. After the emulsion is formed, the remainder of the polyvinyl alcohol is incorporated into the emulsion. Generally, a concentrate is prepared and then diluted as required. The concentrate is diluted with water and the organic acid to provide a concentration of polyvinyl alcohol in the final coating composition of between about 0.001% and 5%, and preferably between about 0.05% and 0.2% by weight of the composition. Although compositions containing proportions of polyvinyl alcohol outside the preferred range produce benefits and advantages of the invention, the lower concentrations tend to produce very thin coatings which are less desirable since a number of coats are required, while higher concentrations tend to produce compositions of higher viscosity which make it more difficult to form a smooth, uniform coating.

The composition of the present invention employed to coat the glass advantageously comprises between about 0.001% and 5% by weight of polyvinyl alcohol, and preferably between about 0.05% and 0.2% as set forth above. The concentration of the polyolefin is advantageously between about 0.001% and 5% by weight of the composition and preferably between about 0.04% and 0.15%. Advantageously, the organic acid comprises between about 0.0001% and 6% by weight of the composition with a concentration in the range of about 0.01% and 0.25% being preferred.

The composition may be applied to the glass by any convenient method and preferably by spraying or atomizing. Advantageously, the composition is applied to the glass at a temperature above about 160° F. Coating of the glass may be conveniently accomplished as the glass emerges from an annealing lehr. However, if desired, the composition may be applied to cold glass either before or during reheating thereof.

The maximum temperature to which the coating is exposed to form the desired reaction product is not critical but is limited only by the temperature which causes the glass to thermo-check, that is, cracking or crazing of the surface. Preferably, the coating is heated to a temperature in the range of about 180° to 500° F.

The invention will be described in detail with reference to the following examples. It is intended that the examples be illustrative of the invention and not limiting the invention to the specific procedures and conditions set forth. In the examples, parts and percentages are by weight.

Example I

Eight parts of polyethylene having a molecular weight of about 2500 which had been previously melted, were mixed with about 1 part of polyvinyl alcohol containing less than about 1% of residual acetate groups and having a saponification number less than about 12, 2 parts by weight of polyoxyethylene sorbitan monostearate and 20 parts of boiling water. The mixture was agitated thoroughly and then added to about 11 parts of the above polyvinyl alcohol which had been dissolved in about 200 parts of hot water. Ten parts of the above mixture were then diluted with about 590 parts of water and 0.7 part of chloroacetic acid.

The resulting composition containing about 0.08% polyvinyl alcohol, 0.07% polyethylene, and 0.1% chloroacetic acid was sprayed onto a series of 5-ounce glass baby food jars as the jars emerged from an annealing lehr. The jars were at a temperature of about 200° F. The coated jars were allowed to cool slowly while maintaining a temperature above about 160° F. for about 1 minute.

Samples of the coated jars, together with uncoated control samples formed prior to and succeeding the coated jars, were tested to determine the coefficient of friction of the external surface thereof. The coefficient of friction for the coated jars was only about one-fourth that of the similar uncoated jars.

The durability of the coating was determined by submerging the jars in a pressure cooker. The water in the cooker was heated to about 250° F. and maintained at about 15 p.s.i. pressure for approximately 30 minutes. The jars were removed from the pressure cooker and permitted to cool and the lubricity checked again. Although the coefficient of friction for the coated jars was slightly greater, it was still only about one-half that of similar uncoated jars.

Labeling tests were also conducted with samples of the coated jars to determine the labeling characteristics. In all cases, labels adhered tightly even after exposing the labeled jars to a steam treatment at about 220° F.

Example II

The procedure of this example was the same as that of Example I, except that about 4 parts of polyethylene were employed in place of the quantity recited in Example I. After dilution, the composition applied to the jars contained about 0.08% polyvinyl alcohol, 0.35% polyethylene and 0.1% chloroacetic acid.

The coated jars were tested according to the procedures of Example I and found to show the improvements and advantages exhibited by the coated jars of Example I.

Example III

The procedure of this example was the same as that of Example I, except that about 0.4 part of chloroacetic acid was employed in diluting the concentrated mixture to form the coating composition.

The coating was applied to glass jars by spraying while the jars were at a temperature of approximately 180° F. The coated jars were tested and found to show improvements over uncoated jars similar to those of Examples I and II.

Example IV

The procedure of this example was the same as that of Example I, except that 0.375 part of phosphoric acid was used in combination with 0.625 part of acetic acid. Coated jars exhibited the superiorities and advantages shown by the coated pars of Examples I, II and III.

Example V

The procedure of this example was the same as that of Example I, except that about 0.55 part of carbonic acid was employed in diluting the concentrated mixture to form the coating composition.

Coated jars exhibited the superiorities and advantages shown by the coated jars of the previous examples.

It is clear from the above description and examples that the present invention provides a new and improved coating for glass which overcomes many of the problems encountered heretofore and in addition, provides benefits and advantages which previously were not attainable. The coating of the invention provides a highly lubricous, durable coating which greatly minimizes damage to glass during handling and use. Moreover, labels adhere tightly to the coated surfaces even after extended periods of handling and storage. In addition, the method of the invention for coating glass surfaces is simple and convenient and relatively low in cost. Furthermore, the coating of the invention does not change the appearance of the glass.

It will be apparent from the above description that various modifications in the formulations and procedures described may be made within the scope of the invention. Therefore, the invention is not intended to be limited to the specific details described herein except as may be required by the following claims.

What is claimed is:

1. A glass article coated with a durable, lubricous, label accepting coating comprising the reaction product formed at a temperature above about 160° F. of polyvinyl alcohol, emulsified polyethylene and an aliphatic acid; said polyolefin comprising between about 40% and 90% by weight of the polyvinyl alcohol in said coating.

2. A glass article coated with a durable, lubricous, label accepting coating comprising the reaction product formed at a temperature above about 160° F. of polyvinyl alcohol, emulsified polyethylene and acetic acid; said polyethylene comprising between about 40% and 90% by weight of the polyvinyl alcohol in said coating and said acetic acid comprisnig between about 10% and 300% by weight of the polyvinyl alcohol in said coating.

3. A method of forming a durable, lubricous, label accepting coating on a glass surface which comprises applying to said surface a mixture comprising polyvinyl alcohol, an emulsified polyolefin and an organic acid and heating said applied coating to a temperature above about 160° F.

4. A method of forming a durable, lubricous, label accepting coating on a glass surface which comprises applying to said surface while it is at a temperature above about 160° F. an aqueous mixture comprising polyvinyl alcohol, emulsified polyethylene and an organic acid.

5. A method of forming a durable, lubricous, label accepting coating on a glass article which comprises applying to said article an aqueous mixture comprising polyvinyl alcohol, an emulsified polyolefin and an aliphatic acid and heating said applied coating to a temperature above about 160° F.; said aqueous mixture containing between about 0.001% and 5% by weight of the polyvinyl alcohol, between about 0.001% and 5% by weight of the polyolefin and between about 0.0001% and 6% by weight of the aliphatic acid.

6. A method of forming a durable, lubricous, label accepting coating on a glass article which comprises applying to said article while it is at a temperature between about 180° and 500° F. an aqueous mixture comprising between about 0.05% and 0.2% by weight of polyvinyl alcohol, between about 0.04% and 0.15% by weight of emulsified polyethylene and between about 0.01% and 0.25% by weight of acetic acid.

7. A glass article coated with a durable, lubricous, label accepting coating comprising the reaction product obtained by reacting of an admixture of polyvinyl alcohol, an emulsified polyolefin and an organic acid at a temperature above about 160° F.

8. A glass article coated as in claim 7 wherein the polyolefin is polyethylene.

9. A glass article coated as in claim 7 wherein the organic acid is an aliphatic acid.

10. A glass article coated as in claim 7 wherein the organic acid is selected from the group consisting of carbonic acid, acetic acid, chloroacetic acid, oxalic acid, malonic acid, succinic acid, and 2,6-dihydroxy benzoic acid.

11. A composition for forming a durable, lubricous, label accepting coating on glass comprising about 1 to 4 parts by weight of polyvinyl alcohol, between about .8 to 3 parts by weight of emulsified polyolefin, and an organic acid.

12. A composition for forming a durable, lubricous, coating on glass comprising between about 1 to 4 parts by weight of polyvinyl alcohol, between about .8 to 3 parts by weight of emulsified polyethylene, and between about .2 to 5 parts by weight of an organic acid.

13. A composition as set forth in claim 12 wherein the organic acid is selected from the group consisting of carbonic acid, acetic acid, chloroacetic acid, oxalic acid, malonic acid, succinic acid, and 2,6-dihydroxy benzoic acid.

References Cited by the Examiner

UNITED STATES PATENTS

| | | | |
|---|---|---|---|
| 2,439,108 | 4/1948 | Staehle | 117—124 |
| 2,995,533 | 8/1961 | Parmer et al. | 260—29.6 |
| 3,023,337 | 2/1962 | Repsher | 117—124 |

FOREIGN PATENTS 23,042  4/1962  Germany.

MURRAY TILLMAN, *Primary Examiner.*

W. J. BRIGGS, *Assistant Examiner.*

UNITED STATES PATENT OFFICE

CERTIFICATE OF CORRECTION

Patent No. 3,296,174                      January 3, 1967

John Edward Pickard

It is hereby certified that error appears in the above numbered patent requiring correction and that the said Letters Patent should read as corrected below.

In the heading to the printed specification, lines 5 and 6, for "Ball Brothers Company Inc." read -- Ball Brothers Company Incorporated --; column 1, line 65, for "another" read -- Another --; column 3, line 74, for "0.35%" read -- 0.035% --; column 4, line 21, for "pars" read -- jars --; line 64, for "comprisnig" read -- comprising --.

Signed and sealed this 5th day of November 1968.

(SEAL)
Attest:

Edward M. Fletcher, Jr.                    EDWARD J. BRENNER
Attesting Officer                        Commissioner of Patents